Sept. 6, 1966    J. H. EAGLE    3,270,974
SELF-THREADING CAMERA
Filed Oct. 30, 1963    2 Sheets-Sheet 1

John H. Eagle
INVENTOR

BY
ATTORNEYS

Sept. 6, 1966          J. H. EAGLE          3,270,974
SELF-THREADING CAMERA
Filed Oct. 30, 1963          2 Sheets-Sheet 2
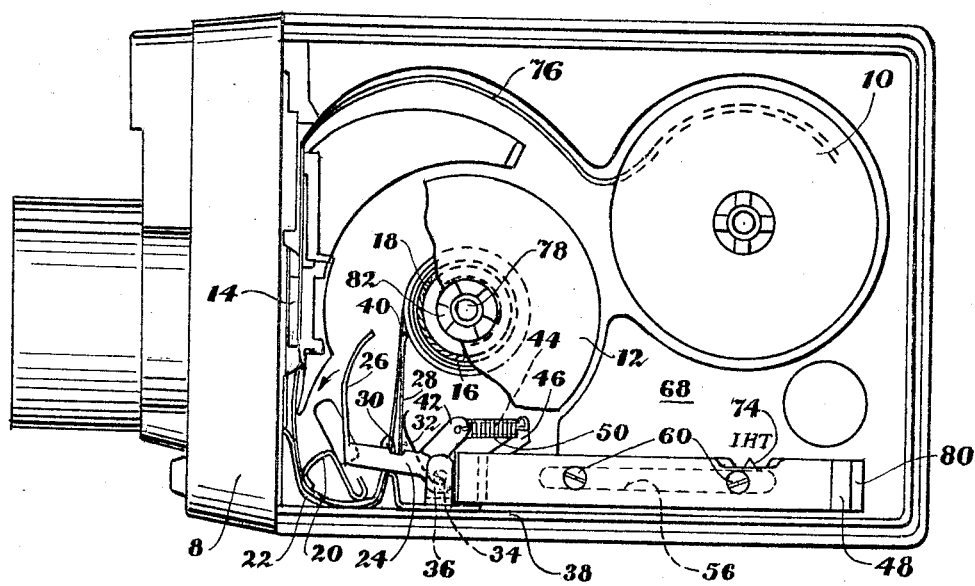
*Fig. 3*
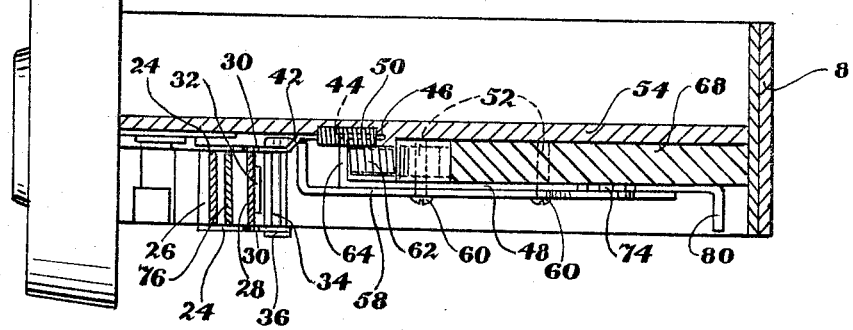
*Fig. 4*
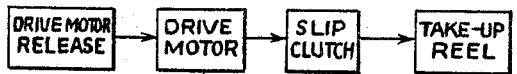
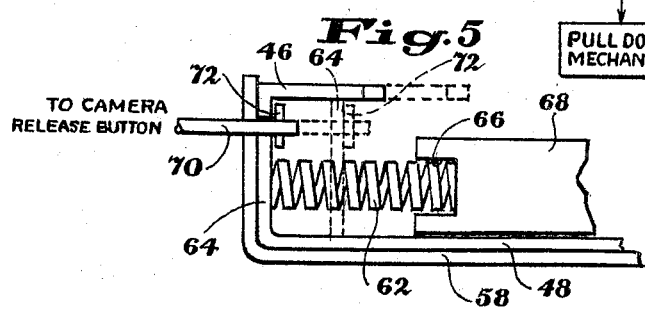
*Fig. 5*      *Fig. 6*
John H. Eagle
INVENTOR.
BY R. Frank Smith
Steve W. Thrembow
ATTORNEYS

United States Patent Office 3,270,974
Patented Sept. 6, 1966

3,270,974
SELF-THREADING CAMERA
John H. Eagle, Rochester, N.Y., assignor to Eastman Kodak Company, Rochester, N.Y., a corporation of New Jersey
Filed Oct. 30, 1963, Ser. No. 320,026
5 Claims. (Cl. 242—71)

This invention relates generally to cameras, and more specifically to a self-threading motion-picture camera.

In all of the self-threading motion-picture cameras that applicant is aware of, it is necessary for the operator to assemble the camera cover before initiating operation of the camera to automatically thread the film onto the take-up spool. One disadvantage of cameras of this type is that the operator has no opportunity to check the final and most difficult step in an automatic threading operation, namely that of insertion of the film end into the take-up spool and the rotation of the take-up spool through several revolutions to assure that the film is properly engaged. Consequently, if the automatic threading operation is unsuccessful, film jamming will occur. Applicant's invention is believed to obviate these and other disadvantages of prior art self-threading cameras.

It is therefore an object of the present invention to provide an improved self-threading camera in which a film guide is automatically moved to and from a threading position.

Another object of this invention is to provide an improved self-threading camera in which the operator can observe the entire threading operation prior to assembling the camera cover onto the camera body.

Another object of the invention is to provide a self-threading camera that eliminates jamming of the camera during the threading operation.

A more specific object of the invention is to provide a self-threading camera having a film guide movable between a first position in which film is threaded onto a take-up spool, a second position in which the spool is rotated to wind some film thereon, and a third position in which the camera is stopped in a fully threaded position.

Still another object of the invention is the provision of an improved self-threading camera of simple design and construction, thoroughly reliable and efficient in operation, and economical to manufacture.

Objects and advantages other than those set forth above will be apparent from the following description when read in connection with the accompanying drawings, in which:

FIG. 3 is a view similar to FIG. 1 with the threading mechanism in a hold position;

FIG. 4 is a section view taken substantially along line 4—4 of FIG. 2;

FIG. 5 is a segmental view showing the connection between the threading mechanism and the camera motor;

FIG. 6 is a block diagram showing the interaction between some of the camera elements that are well known in the art.

Figure 1:
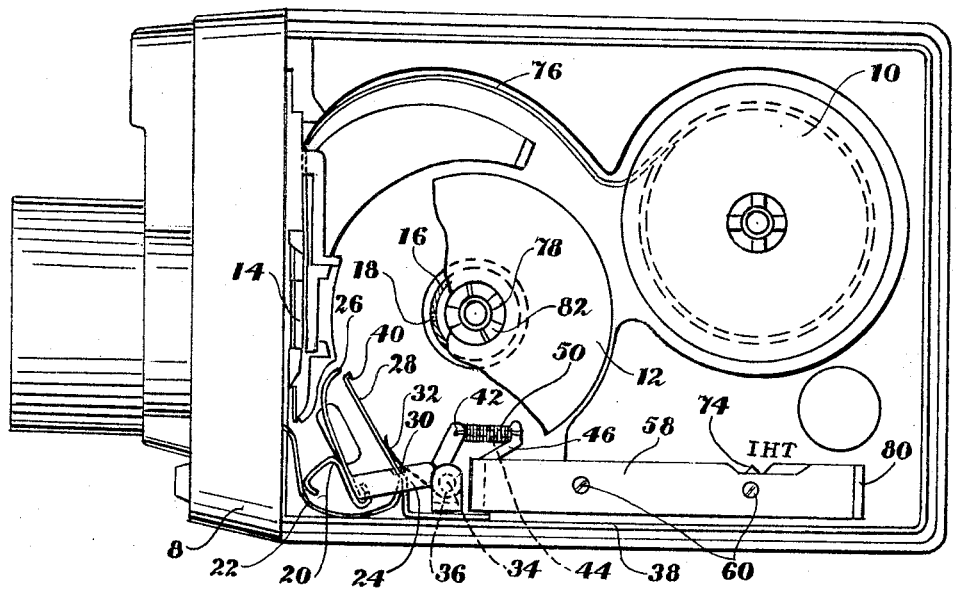
FIG. 1 is a side elevation view of a motion-picture camera in which a preferred form of the invention is embodied, the camera having its cover removed, a portion of the take-up spool broken away and sectioned, and the threading mechanism in its inoperative position.

As shown in the drawings, this invention is embodied in a motion-picture camera 8 of known type having a film supply spool 10, a film take-up spool 12, a film gate 14, a conventional intermittent film pull-down mechanism shown in block diagram form in FIG. 6 associated with the film gate, and a drive motor also shown in FIG. 6 for driving the pull-down mechanism and the take-up spool 12 through a tendency drive such as a slip clutch (see FIG. 6) as is well known in the art. The take-up spool 12 is of a known type having a hub 16 with a longitudinal threading slot 18 therein as seen best in FIG. 1. The pull-down mechanism and drive motor form the film transporting mechanism for the camera.

Figure 2:
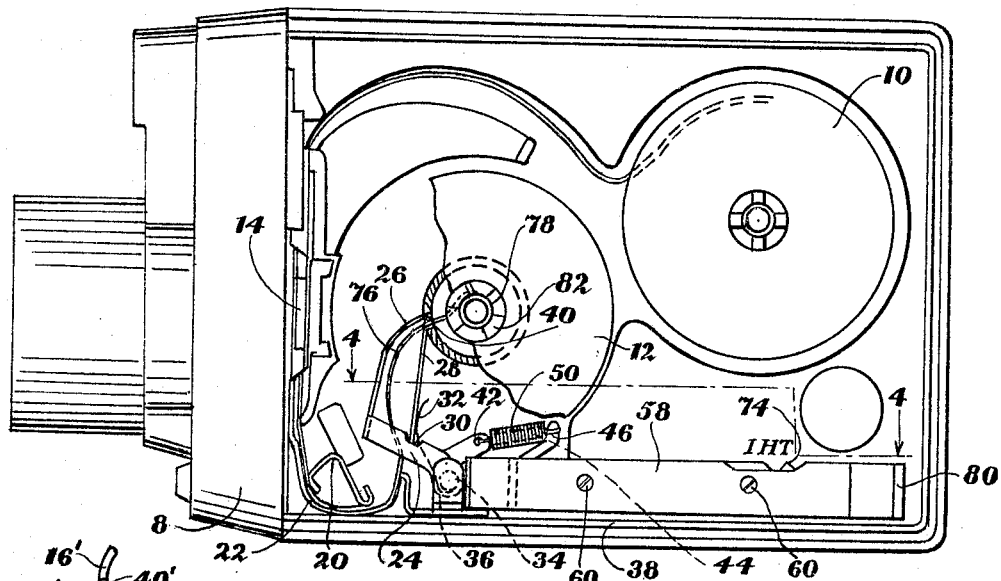
FIG. 2 is a view similar to FIG. 1 with the threading mechanism of the camera in its threading position.

The automatic film-threading mechanism of this camera comprises upper and lower fixed film guide members 20, 22, respectively, for directing the film from film gate 14 into a pivotal film guide or chute. The film chute comprises a U-shaped bracket 24 pivotally mounted on a pin 34 carried by spaced apart end plates 36 of a U-shaped member secured to a camera wall 38. The bracket 24 has an outer film guide plate 26 integral therewith and extending therefrom, and an inner guide plate 28 having one end thereof seated in notches 30 in the sides of bracket 24 to permit pivotal movement of plate 28 relative to bracket 24. A leaf spring 32 has one end encircling pin 34 and its opposite end bearing against plate 28 for urging the plate to the left as seen in FIG. 1 and down into the notches. The inner guide plate 28 has a lip 40 on its free end which in the threading position of the mechanism, as seen in FIG. 2, engages the periphery of the hub 16 of the take-up spool and drops into slot 18 therein upon rotation of take-up spool 12 for releasably holding the spool from further rotation. The end of plate 28 is designed to engage only one or both edge portions of the film so as not to abrade the emulsion as is well known. The bracket 24 further has an arm 42 integral therewith connected by a helical spring 44 to an arm 46 integral with a slidable lever 48. A plastic tube 50 encircles the helical spring 44. As lever 48 is slidably moved to the right from the FIG. 1 position, the film chute is pivoted in a clockwise direction to the FIG. 2 position by virtue of the spring connection. When lever 48 is returned to its FIG. 1 position, the plastic tube 50 serves as a rigid link for pivotally returning the film chute to its FIG. 1 position. The lever 48 is slidably movable on fixed pins 52 (see FIG. 4) extending from a mounting plate 54 through an elongated slot 56 in lever 48. A bracket 58 is rigidly secured to pins 52 by screws 60. The lever 48 is biased to the left as seen best in FIG. 5 of the drawings by a helical spring 62 (see FIGS. 4 and 5) having one end bearing against a turned end 64 of lever 48, and its opposite end nesting in a bore 66 in a member 68 secured to plate 54. The lever 48 is further connected to the release button of the camera motor by a slidable rod 70 (see FIG. 5) extending through openings in the bracket 58 and lever end 64. A collar 72 is secured to the end of rod 70 so that upon movement of lever 48 to the right to the dotted line position in FIG. 5, the slidable rod 70 is moved axially to the right, actuating the camera release button for releasing the camera motor in a known way. The slidable rod 70 is biased by a spring, not shown, for returning the rod to its original position when lever 48 is moved to the left, as viewed in the drawings, to its inoperative position.

The lever 48 further has a pointer 74 along one edge thereof adapted to cooperate with a scale on member 68 to indicate the position to which the lever and film chute of the threading mechanism are moved. The scale has the designations "I," "H" and "T" thereon representing the inoperative, holding and threading positions respectively. A detent means, not shown, may be employed between lever 48 and member 68 for releasably holding the lever and film chute in their various positions.

Figure 7:
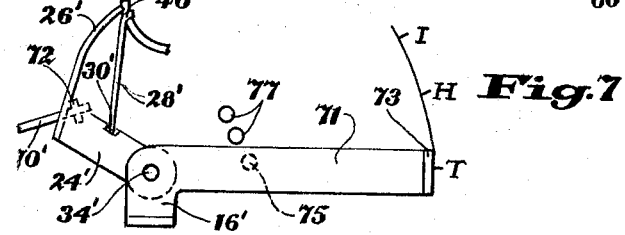
FIG. 7 is a side elevation view of a modification of the threading mechanism of this invention with other parts of the camera omitted for purposes of clarity.

In the modification of the invention shown in FIG. 7, parts similar to parts shown in FIGS. 1–6 are designated by the same numerals primed. In this modification, the control lever 48, bracket 58 and springs 44, 62, among other parts, are eliminated. The film chute has an elongated arm 71 having a handle 73 by which the chute is manually moved between its "I," "H" and "T" positions. A detent ball 75 carried by arm 71 cooperates with notches 77 for releasably holding the chute in the stated positions. A rod 70' for actuating the camera release button has one end thereof extending through a slit in plate 26' so that clockwise pivotal movement of the chute will pull lever 70' to the right. A spring, not shown, returns lever 70' to the left upon counterclockwise movement of the chute.

In the operation of the form of invention disclosed in FIGS. 1–6, the camera threading mechanism is normally in the inoperative position shown in FIG. 1. The operator mounts a supply spool 10 of film 76 in the camera 8 and manually threads the leading end of the film into film gate 14 so that the film will be engaged by the pull-down mechanism when it starts to operate. An empty take-up spool 12 is also mounted on a take-up shaft 78. The operator manually operates handle end 80 of lever 48 and moves the lever to the right to the threading position with the pointer 74 in alignment with the "T" scale mark (see FIG. 2). The camera motor is released by movement of the slidable rod 70 and drives the pull-down mechanism, and the take-up spool 12 through the slip clutch as indicated in FIG. 6. Movement of lever 48 to the "T" position moves plates 26, 28 of the film chute in a pivotal clockwise direction by means of spring 44, causing lip 40 of plate 28 to bear against the periphery of hub 16 by virtue of spring 44. The lip 40 drops into slot 18 in hub 16 as the slot registers with the lip upon rotation of the spool 12 by the film transport mechanism, and releasably holds the spool against further rotation by the motor. Operation of the film transport mechanism transports the film 76 through the fixed film guides 20, 22 and plates 26, 28 of the film chute into slot 18 in hub 16 (see FIG. 2). As soon as the end of film 76 engages an inner core 82 of hub 16, further advance of the film is stopped, and the film pull-down mechanism merely operates on the same film perforations as the camera motor continues to operate. As soon as the operator notes that the film movement has stopped, the lever 48 is manually returned to the "H" or hold position as seen in FIG. 3 in which the bracket 24 is partially pivoted in a counter-clockwise direction withdrawing lip 40 of plate 28 from slot 18 to allow the take-up spool 12 to rotate. Spring 32 urges plate 28 into engagement with the film 76 whose film tension is sufficient to withstand the force of spring 32. The operator can observe the film 76 begin to wind up on the take-up hub 16, and as soon as the film is observed to be properly winding thereon, he returns lever 48 to its "I" or inoperative position, as seen in FIG. 1. This movement stops the camera motor, and places the bracket 24 and plate 26 of the film chute in its inoperative position (FIG. 1), the plate 28 remaining in engagement with the film 76. The operator may then replace the camera cover, not shown, on camera 8 which is now threaded and ready for operation by the usual external operating controls. The invention has been described in detail with particular reference to a preferred embodiment thereof, but it will be understood that variations and modifications can be effected within the spirit and scope of the invention as described hereinabove, and as defined in the appended claims.

I claim:

1. In a self-threading motion-picture camera of the type in which film chute means is engageable with a film take-up spool to releasably hold the spool against rotation and direct film into a film receiving slot in the hub of the spool as the film is fed by a drive motor having selective run and stop conditions and connected by a tendency drive to the take-up spool, the improvement comprising means interconnecting said film chute means to said drive motor for controlling the operation of the motor in accordance with movement of said film chute between (a) a first position in which it starts said drive motor, releasably holds said take-up spool and directs said film into said slot, (b) a second position in which it releases said take-up spool for rotation by said drive motor for winding said fed film onto said hub, and (c) a third position in which it stops said motor.

2. In a self-threading motion-picture camera of the type in which film chute means is engageable with a film take-up spool to hold the spool against rotation and direct film into a film receiving slot in the hub of the spool as the film is fed by a drive motor connected to rotate the take-up spool, the improvement comprising movable control means, and means interconnecting said control means to said film chute means and to said drive motor, said control means controlling the position of said film chute means and the operation of said drive motor in accordance with the position of said control means such that (a) in a first position of said control means said film chute means is held in engagement with said take-up spool and said drive motor operates, (b) in a second position of said control means said film chute means is out of engagement with said take-up spool and said drive motor operates, and (c) in a third position of said control means said film chute means is out of engagement with said take-up spool and said drive motor is disabled.

3. The invention according to claim 2 wherein said control means comprises a slidable lever, a rod connecting said lever to said drive motor, and a helical spring interconnecting said lever and said film chute means.

4. The invention according to claim 3 wherein said helical spring in encased in a plastic tube.

5. The invention according to claim 3 wherein said lever has a pointer cooperating with a scale to indicate the operating position of the control means.

References Cited by the Examiner

UNITED STATES PATENTS

| 2,051,787 | 8/1936 | Foster | 226—91 X |
| 2,983,416 | 5/1961 | Hanken et al. | 226—91 |
| 3,205,506 | 9/1965 | Lessler | 242—55.11 X |

FOREIGN PATENTS

| 1,326,214 | 3/1963 | France. |
| 1,339,823 | 9/1963 | France. |

FRANK J. COHEN, *Primary Examiner.*

GEORGE F. MAUTZ, *Examiner.*